US010447782B2

(12) United States Patent
Lee

(10) Patent No.: US 10,447,782 B2
(45) Date of Patent: Oct. 15, 2019

(54) SLAVE DEVICE CONTROL METHOD

(71) Applicant: LSIS CO., LTD., Anyang-si, Gyeonggi-do (KR)

(72) Inventor: Sung-Han Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 177 days.

(21) Appl. No.: 15/385,229

(22) Filed: Dec. 20, 2016

(65) Prior Publication Data

US 2017/0331894 A1 Nov. 16, 2017

(30) Foreign Application Priority Data

May 10, 2016 (KR) .................. 10-2016-0057164

(51) Int. Cl.
*H04L 29/08* (2006.01)
*H04L 12/26* (2006.01)
*H04L 12/911* (2013.01)
*H04L 12/403* (2006.01)
*H04L 12/40* (2006.01)

(52) U.S. Cl.
CPC ........ *H04L 67/1097* (2013.01); *H04L 12/403* (2013.01); *H04L 43/50* (2013.01); *H04L 47/82* (2013.01); *H04L 67/125* (2013.01); *H04L 2012/4026* (2013.01)

(58) Field of Classification Search
CPC ............. H04L 2012/4026; H04L 47/82; H04L 67/1097; H04L 67/125; H04L 12/403; G05B 19/05; G05B 2219/163; H03K 19/17724
See application file for complete search history.

(56) References Cited

U.S. PATENT DOCUMENTS

| 5,095,417 A | 3/1992 | Hagiwara et al. |
| 9,432,298 B1 * | 8/2016 | Smith ................. H04L 49/9057 |
| 2009/0046732 A1 * | 2/2009 | Pratt, Jr. ................. H04L 12/66 370/406 |
| 2013/0124763 A1 | 5/2013 | Kessler |
| 2013/0136035 A1 | 5/2013 | Bange et al. |

(Continued)

FOREIGN PATENT DOCUMENTS

| JP | 2014233008 A | 12/2014 |
| KR | 10-2007-0038960 A | 4/2007 |

(Continued)

OTHER PUBLICATIONS

Extended European Search Report dated May 19, 2017 corresponding to application No. 16197083.5-1862.

(Continued)

*Primary Examiner* — Todd L Barker
(74) *Attorney, Agent, or Firm* — K&L Gates LLP

(57) ABSTRACT

The present disclosure relates a slave device control method including generating the control message including a plurality of input data and transmitting the control message to a specific slave device among a plurality of slave devices, by a master device, extracting input data from a received data start position of the control message, by the specific slave device, and padding output data to transmitted data storage position of the control message and transmitting the output data to a next slave device, by the specific slave device.

5 Claims, 6 Drawing Sheets

(56) References Cited

U.S. PATENT DOCUMENTS

| | | | |
|---|---|---|---|
| 2013/0170337 A1* | 7/2013 | Vallala | H04L 12/437 |
| | | | 370/223 |
| 2013/0318267 A1 | 11/2013 | Chapelle | |
| 2015/0301968 A1 | 11/2015 | Kessler | |
| 2017/0099158 A1* | 4/2017 | Mizutani | H04L 12/403 |
| 2018/0191352 A1* | 7/2018 | Weber | H03K 19/17732 |

FOREIGN PATENT DOCUMENTS

| | | |
|---|---|---|
| KR | 10-2015-0059091 A | 5/2015 |
| KR | 10-2015-0121008 A | 10/2015 |
| KR | 10-2015-0132226 A | 11/2015 |
| KR | 10-2016-0036726 A | 4/2016 |
| WO | 2015133175 A1 | 9/2015 |

OTHER PUBLICATIONS

Japanese Office Action related to Japanese Application No. 2016-234568; action dated Dec. 5, 2017; (4 pages).

\* cited by examiner

PRIOR ART

SLAVE DEVICE CONTROL METHOD

CROSS REFERENCE TO RELATED APPLICATION

This application claims the benefit of Korean Patent Application No. 10-2016-0057164, filed on May 10, 2016, entitled "SLAVE DEVICE CONTROL METHOD", which is hereby incorporated by reference in its entirety into this application.

BACKGROUND

1. Technical Field

Embodiments of the present disclosure relates to a slave device control method.

2. Description of the Related Art

When there is a plurality of devices connected via a network, the devices are generally classified into a master device and a slave device. A user allows a master device to monitor an operation of a slave device or to transmit commands or data required by the slave device. In general, when there are many slave devices on a network, a master device transmits a control message to each slave device to control the slave device.

In general, a mater device generates control messages corresponding to the number of slave devices present in a network and transmits the generated control messages to the respective slave devices. A slave device may apply a control message received from a master device to each slave device or transmit input data requested by the master device to the master device.

In this case, the master device needs to generate control messages by as much as the number of slave devices in a network and to transmit the control messages to the respective slave devices in order to control the slave devices.

However, as the number of slave devices increases, a master device needs to generate more control messages and to transmit the control messages to each slave device. Accordingly, it is disadvantageous to increase data traffic and, thus, a data transmission time increases and real-time control is difficult.

In order to overcome such a problem, a data transmissions method using EtherCAT communication is used.

The master device D0 packages output data with a fixed size to be transmitted to each slave device to one control message and transmits the generated control message to the control message in order to control slave devices D1 to D4 in a network.

In an EtherCAT communication configuration, slave devices transmit a control message transmitted from the master device D0 to a next slave device via a cut-through method. Here, the cut-through method is a scheme of transmitting a message to a destination immediately upon checking a destination address of a received message in order to minimize transmission standby time of the message.

In the data transmission method using EtherCAT communication, a master device simply generates one control message irrespective of increase in the number of slave devices. Accordingly, increased data traffic is overcome and a data transmission time through a hardware switching method (cut-through) may be reduced.

However, during transmission of a control message between slave devices, a slave device may not transmit another control message in order to prevent data collision.

In addition, a size of a field for storing input data of each slave device is fixed and, thus, there is a limit in a size of data to be transmitted during transmission of a control message generated by a master device. It is disadvantageous that a size of a data field allocated to each of the slave devices is reduced when the number of the slave devices in a network increases.

As the number of slave devices increases, transmission delay of a control message is linearly increased and, thus, there is a problem in that it is difficult to control the slave devices in real time.

SUMMARY

It is an object of the present disclosure to provide a slave device control method for reducing traffic and reducing a data delay time because all devices in a network are capable of transmitting and receiving data using one control message.

It is another object of the present disclosure to provide a slave device control method for flexibly changing a size of data transmitted to each slave device by a master device and a size of data to be transmitted to a master device by a slave device.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a slave device control method includes generating the control message including a plurality of input data and transmitting the control message to a specific slave device among a plurality of slave devices, by a master device, extracting input data from a received data start position of the control message, by the specific slave device, and padding output data to transmitted data storage position of the control message and transmitting the output data to a next slave device, by the specific slave device.

DETAILED DESCRIPTION

The above objects, features and advantages will become apparent from the detailed description with reference to the accompanying drawings.

The term "received data start position" used herein refers to a position in which a slave device needs to extract input data among a plurality of input data of a control message. For example, the received data start position may be a start position or last position of a control message. The received data start position may be determined according to an arrangement order of a plurality of input data and an order of slave devices that receive a control message.

The term "transmitted data storage position" used herein refers to a position in which a slave device needs to pad output data. The transmitted data storage position may be changed according to the received data start position. For example, when the received data start position is a start position of a control message, the transmitted data storage position may be a last position of a control message. When the received data start position is a last position of a control message, the transmitted data storage position may be a start position of a control message.

Figure 1:
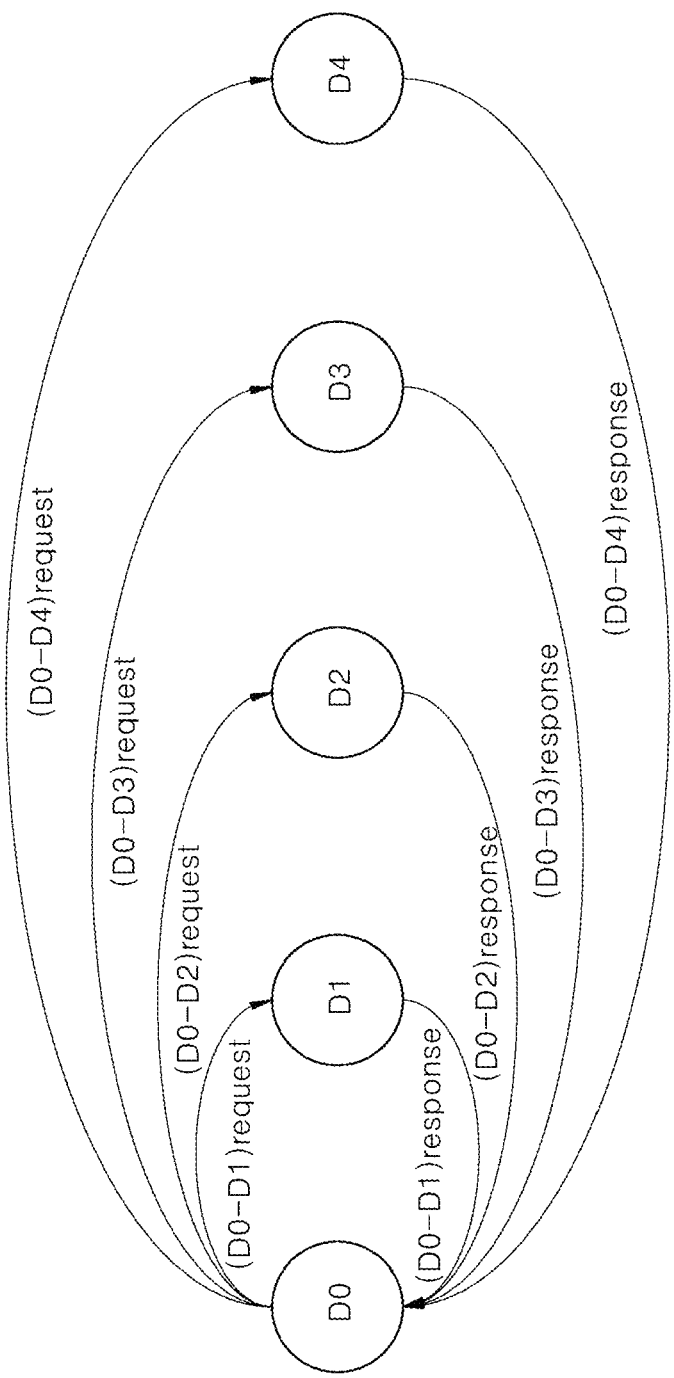
FIG. 1 is a reference diagram for explanation of a method of transmitting data between a general master device and slave device.

FIG. 1 is a reference diagram for explanation of a method of transmitting data between a general master device and slave device.

Referring to FIG. 1, a master device D0 may generate control messages corresponding to the number of slave devices present in a network and transmit the generated control messages to respective slave devices D1 to D4. The slave devices D1 to D4 may apply the control message received from the master device D0 to the slave devices D1 to D4 or transmit input data requested by the master device D0 to the master device D0.

In this case, in order to control the slave devices D1 to D4, the master device D0 needs to generate control messages by as much as the number of the slave devices D1 to D4 in a network and to transmit the control messages to the slave devices D1 to D4, respectively.

However, as the number of the slave devices D1 to D4 increases, the master device D0 needs to transmit more control messages and to transmits the control messages to the slave devices D1 to D4, respectively. Accordingly, it may be disadvantageous that data traffic increases and, thus, a data transmission time is increased and real-time control is difficult.

In order to overcome such a problem, a data transmissions method using EtherCAT communication is used.

Figure 2:
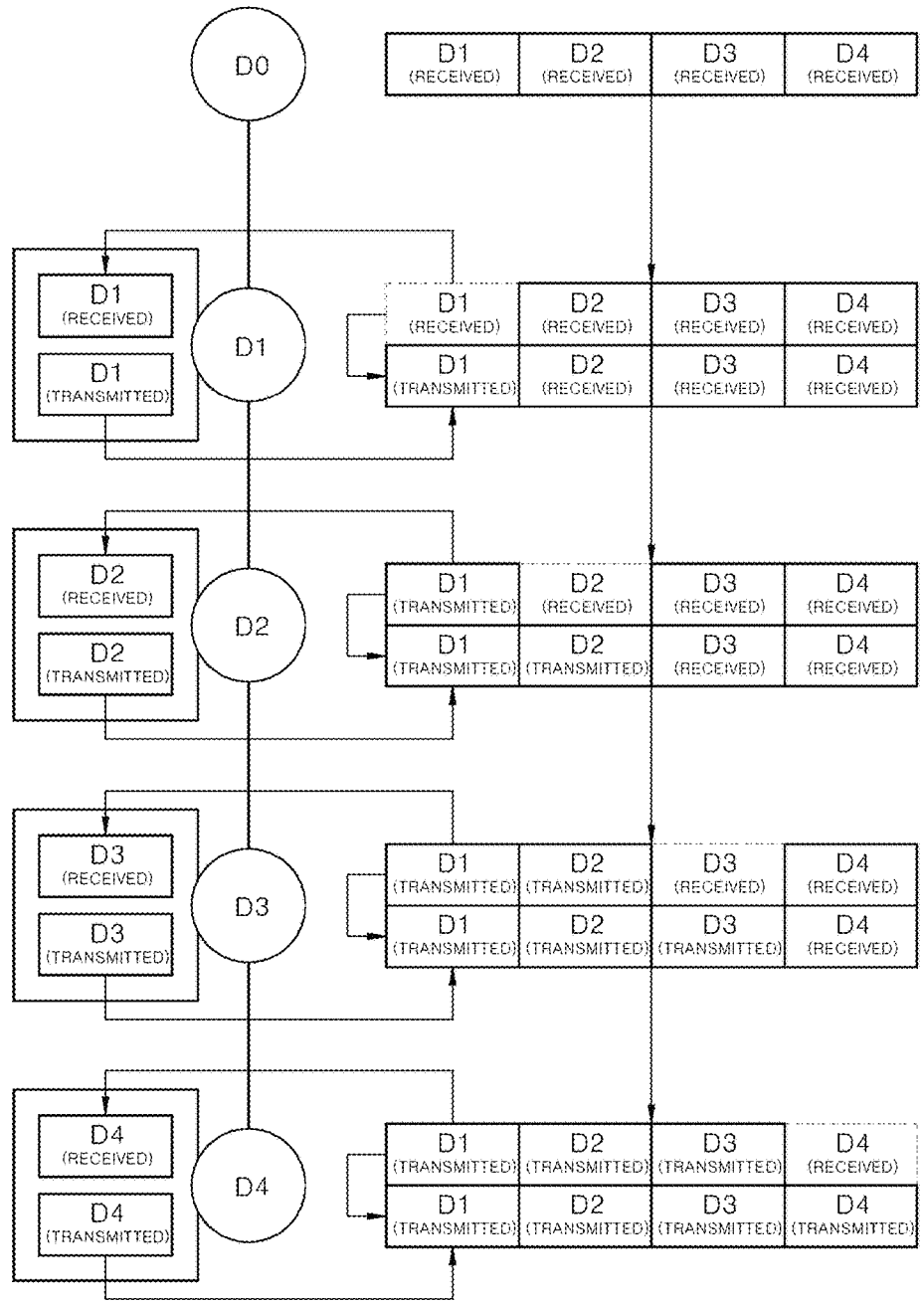
FIG. 2 is a reference diagram for explanation of a general method of transmitting data using EtherCAT communication.

FIG. 2 is a reference diagram for explanation of a general method of transmitting data using EtherCAT communication.

Referring to FIG. 2, the master device D0 may package output data (D1 (received), D2 (received), D3 (received), and D4 (received)) of a fixed size to be transmitted to the respective slave devices D1 to D4 to one control message and transmit the generated control message to the slave device D1 in order to control the slave devices D1 to D4 in a network.

In an EtherCAT communication configuration illustrated in FIG. 2, the slave devices D1 to D4 may transmit the control message transmitted from the master device D0 to each next slave device using a cut-through method. Here, the cut-through method is a scheme of transmitting a message to a destination immediately upon checking a destination address of a received message in order to minimize transmission standby time of the message.

First, the slave device D1 that receives the control message from the master device D0 may extract input data (D1 (received)) from a first field of the control message, corresponding to the slave device D1. Then, the slave device D1 may output data (D1 (transmitted)) in the first field of the control message to the slave device D2.

Upon receiving the control message from the slave device D1, the slave device D2 may extract input data (D2 (received)) from a second field of the control message, corresponding to the slave device D2. Then, the slave device D2 may transmit output data (D2 (transmitted)) in the second field of the control message to the slave device D3.

Upon receiving the control message from the slave device D2, the slave device D3 may extract input data (D3 (received)) from a third field of the control message, corresponding to the slave device D3. Then, the slave device D3 may transmit output data (D3 (transmitted)) in the third field to the slave device D3.

Upon receiving the control message from the slave device D3, the slave device D4 may extract input data (D4 (received)) from a fourth field of the control message, corresponding to the slave device D4. Then, the slave device D4 may transmit output data (D4 (transmitted)) in the fourth field to the master device D0.

The master device D0 may check whether each of the slave devices D1 to D4 is normally operated through output data (D1 (transmitted), D2 (transmitted), D3 (transmitted), and D4 (transmitted)) included in the control message received from the slave device D4.

In the method of transmitting data using EtherCAT communication described with reference to FIG. 2, the master device D0 may generate one control message irrespective of increase in the number of the slave devices D1 to D4. Accordingly, disadvantage in terms of increased data traffic may be overcome and a data transmission time may be reduced via a hardware switching method (cut-through).

However, in order to prevent data collision during transmission of a control message between the slave devices D1 to D4, the slave devices D1 to D4 may not transmit other control message.

In the control message generated by the master device D0, there is a limit in a size of data to be transmitted due to a fixed size of a field for storing input data of each of the slave devices D1 to D4. It may be disadvantageous that a size of a data field allocated to each of the slave devices D1 to D4 in the case of the large number of the slave devices D1 to D4 in a network.

As the number of the slave devices D1 to D4 increases, transmission delay of the control message linearly increases and, thus, there is a problem in that it may be difficult to control the slave devices D1 to D4 in real time.

Figure 3:
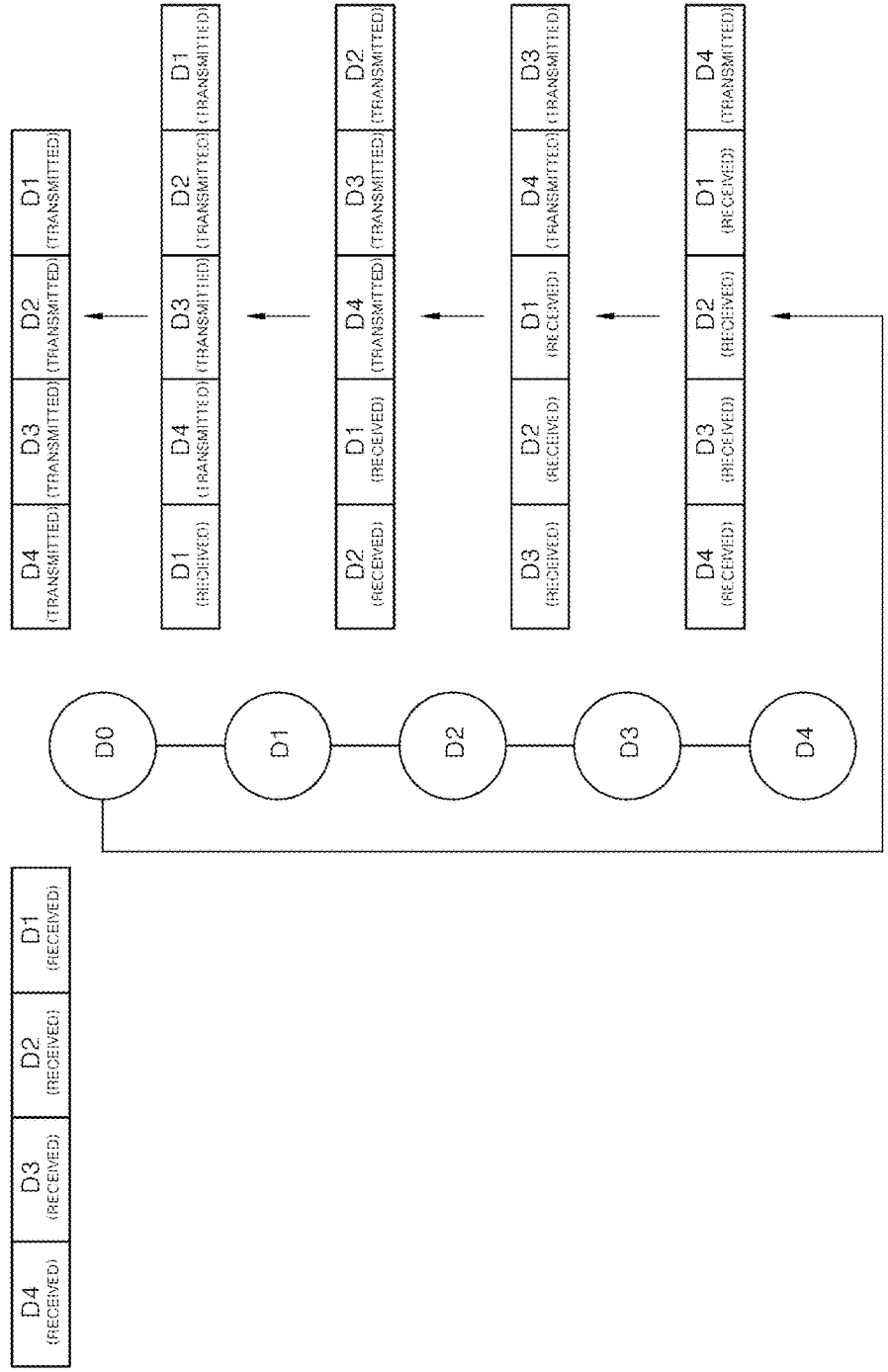
FIG. 3 is a reference diagram for explanation of a data transmission method between a mater device and a slave device according to an exemplary embodiment of the present disclosure.

FIG. 3 is a reference diagram for explanation of a data transmission method between a mater device and a slave device according to an exemplary embodiment of the present disclosure.

Referring to FIG. 3, the master device D0 may generate a control message including a plurality of input data (D1 (received), D2 (received), D3 (received), and D4 (received)). In this case, the master device D0 may align a plurality of input data in an order in which a plurality of slave devices is connected or an opposite order to generate a control message.

The plurality of input data ((D1 (received), D2 (received), D3 (received), and D4 (received)) may include data required by the slave devices D1 to D4 or commands for monitoring operations of the slave devices D1 to D4. Accordingly, the slave devices D1 to D4 may extract input data from the control message received from the master device D0 and apply the input data to the slave devices D1 to D4. In addition, the slave devices D1 to D4 may pad output data requested by the master device D0 to the control message and transmit the output data to the master device D0.

In the exemplary embodiment of FIG. 3, the master device D0 may align the plurality of input data in an opposite order to an order in which the plurality of slave devices D1 to D4 is connected and generate a control message including a plurality of input data (D4 (received), D3 (received), D2 (received), and D1 (received)). However, unlike in FIG. 3, the master device D0 may align a plurality of input data in an order in which the plurality of slave devices D1 to D4 are connected to generate a control message including a plurality of input data (D1 (received), D2 (received), D3 (received), and D4 (received)). As described above, when the master device D0 generates a control message using a plurality of input data, a plurality of input data (D1 (received), D2 (received), D3 (received), D4 (received)) according to a size of data to be transmitted to each of the plurality of slave devices D1 to D4. As such, the master device D0 may flexibly change a size of data transmitted to the slave devices D1 to D4.

Like in the exemplary embodiment of FIG. 3, when the master device D0 aligns a plurality of input data in an opposite order to an order in which the plurality of slave devices D1 to D4 are connected to generate a control message, the control message may be transmitted to the last slave device D4 among the plurality of slave devices D1 to D4.

In this case, the master device D0 transmits the control message to the last slave device D4 among the plurality of slave devices D1 to D4 in order to transmit the control messages processed by the plurality of slave devices D1 to D4 in a backward direction (i.e., D4→D3→D2→D1) to the master device D0 as a last destination. Accordingly, the master device D0 may check whether each of the plurality of slave devices D1 to D4 is normally operated based on output data of the control message.

In detail, upon receiving a control message from the master device D0, the slave device D4 may extract input data (D4 (received)) from the received data start position of the control message. In this case, the input data (D4 (received)) may be deleted from the control message. Then, the slave device D4 may pad output data (D4 (transmitted)) to the transmitted data storage position of the control message and transmit the output data (D4 (transmitted)) to the slave device D3. Here, padding of the output data to the control message may refer to record of output data in the control message.

In this case, the received data start position may be a start position of the control message and the transmitted data storage position may be a last position of the control message. Accordingly, the slave device D4 may extract input data (D4 (received)) from a start position of the control message, pad output data (D4 (transmitted)) to a last position of the control message, and transmit the output data to the slave device D3.

The slave device D4 may generate output data (D4 (transmitted)) according to a size of data to be transmitted to the master device D0. Then, the slave device D4 may pad output data (D4 (transmitted)) to the transmitted data storage position of the control message and transmit the output data to the slave device D3. As such, the slave device D4 may flexibly change a size of data transmitted to the master device D0.

Upon receiving a control message from the slave device D4, the slave device D3 may extract input data (D3 (received)) from the received data start position of the control message. In this case, the input data (D3 (received)) may be deleted from the control message. Then, the slave device D3 may pad the output data (D3 (transmitted)) to the transmitted data storage position of the control message and transmit the output data to the slave device D2.

Upon receiving a control message from the slave device D3, the slave device D2 may extract input data (D2 (received)) from the received data start position of the control message. In this case, the input data (D2 (received)) may be deleted from the control message. Then, the slave device D2 may pad output data (D2 (transmitted)) to the transmitted data storage position and transmit the output data to the slave device D1.

Upon receiving a control message from the slave device D2, the slave device D1 may extract input data (D1 (received)) from the received data start position of the control message. In this case, the input data (D1 (received)) may be deleted from the control message. Then, the slave device D1 may pad the output data (D1 (transmitted)) to the transmitted data storage position of the control message and transmit the output data to the master device D0.

Accordingly, the master device D0 may receive a control message including the output data (D1 (transmitted), D2 (transmitted), D3 (transmitted), and D4 (transmitted)). Then, the master device D0 may check whether each of a plurality of slave devices is normally operated based on output data of the control message.

Figure 4:
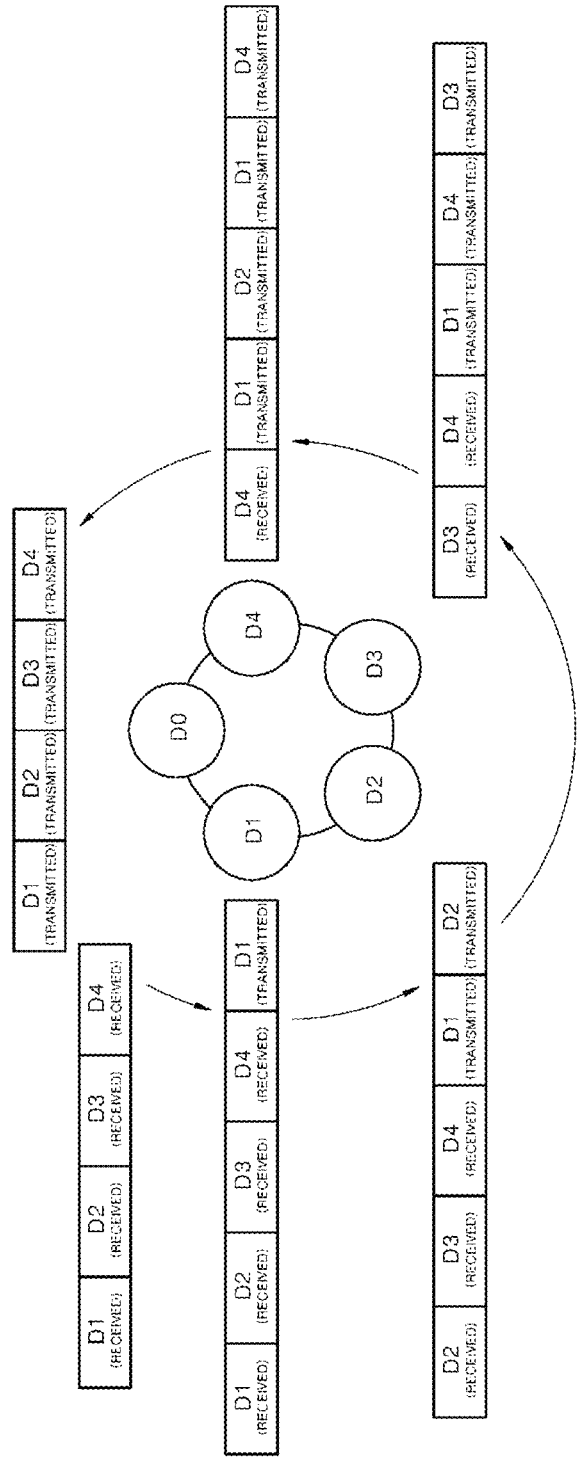
FIG. 4 is a reference diagram for explanation of a data transmission method between a mater device and a slave device according to another exemplary embodiment of the present disclosure.

FIG. 4 is a reference diagram for explanation of a data transmission method between a mater device and a slave device according to another exemplary embodiment of the present disclosure.

Referring to FIG. 4, the master device D0 may generate a control message including a plurality of input data (D1 (received), D2 (received), D3 (received), and D4 (received)). In this case, the master device D0 may align may align a plurality of input data in an order in which the plurality of slave devices D1 to D4 is connected or an opposite order to generate a control message.

In the exemplary embodiment of FIG. 4, the master device D0 may align the plurality of input data in an order in which the plurality of slave devices D1 to D4 is connected to generate a control message including a plurality of input data (D1 (received), D2 (received), D3 (received), and D4 (received)). However, unlike in FIG. 4, the master device D0 may align a plurality of input data in an opposite order to an order in which the plurality of slave devices D1 to D4 are connected to generate a control message a plurality of input data (D4 (received), D3 (received), D2 (received), and D1 (received)).

Like in the exemplary embodiment of FIG. 4, when the master device D0 aligns a plurality of input data in an order in which the plurality of slave devices D1 to D4 is connected to generate a control message, the control message may be transmitted to the first slave device D1 among the plurality of slave devices D1 to D4.

In this case, the master device D0 transmits the control message to the first slave device D1 among the plurality of slave devices D1 to D4 in order to transmit the control messages processed by the plurality of slave devices D1 to D4 in a forward direction (i.e., D1→D2→D3→D4) to the master device D0 as a last destination when devices in a network are connected in the form of a ring like in FIG. 4. Accordingly, the master device D0 may check whether each of a plurality of slave devices is normally operated based on output data of the control message.

In detail, the master device D0 may transmit the control message to the slave device D1. The slave device D1 that receives the control message from the master device D0 may extract input data (D1 (received)) from the received data start position of the control message. In this case, the input data (D1 (received)) may be deleted from the control message. Then, the slave device D1 may pad the output data (D1 (transmitted)) to the transmitted data storage position of the control message and transmit the output data to the slave device D2.

In this case, the received data start position may be a start position of the control message and the transmitted data storage position may be a last position of the control message. Accordingly, the slave device D1 may extract input data (D1 (received)) from a start position of the control message, pad output data (D1 (transmitted)) to a last position of the control message, and transmit the output data to the slave device D2.

Upon receiving a control message from the slave device D1, the slave device D2 may extract input data (D2 (received)) from the received data start position of the control message. In this case, input data (D2 (received)) may be deleted from the control message. Then, the slave device D2 may pad output data (D2 (transmitted)) to the transmitted data storage position of the control message and transmit the output data to the slave device D3.

Upon receiving a control message from the slave device D2, the slave device D3 may extract input data (D3 (received)) from the received data start position of the control message. In this case, the input data (D3 (received)) may be deleted from the control message. Then, the slave device D3 may pad output data (D3 (transmitted)) to the transmitted data storage position of the control message and transmit the output data to the slave device D4.

Upon receiving a control message from the slave device D3, the slave device D4 may extract input data (D4 (received)) from the received data start position of the control message. In this case, the input data (D4 (received)) may be deleted from the control message. Then, the slave device D4 may pad output data (D4 (transmitted)) to the transmitted data storage position of the control message and transmit the output data to the master device D0.

Accordingly, the master device D0 may receive a control message including output data (D1 (transmitted)), D2 (transmitted), D3 (transmitted), and D4 (transmitted)). Then, the master device D0 may check whether each of a plurality of slave devices is normally operated based on output data of the control message.

Figure 5:
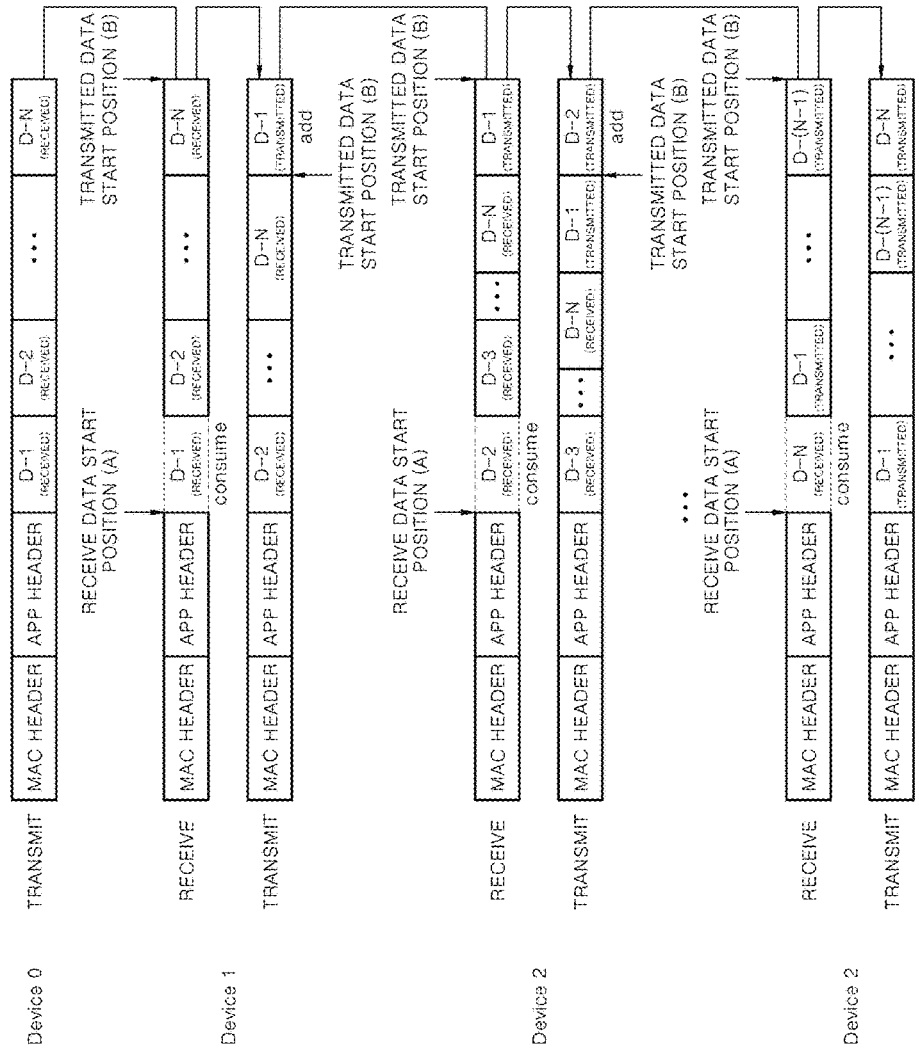
FIG. 5 is a reference diagram for explanation of a data transmission method between a master device and a master device according to an exemplary embodiment of the present disclosure.

FIG. 5 is a reference diagram for explanation of a data transmission method between a master device and a master device according to an exemplary embodiment of the present disclosure.

Referring to FIG. 5, the master device D0 may generate a control message including MAC HEADER, APP HEADER, and a plurality of input data (D-1 (received), D-2 (received), . . . , D-N (received)) and transmit the control message to the slave device D1. The MAC HEADER may include a MAC address of a transmitting side for transmitting a control message, a MAC address of a receiving side for receiving a control message, an Ethernet type, and so on. Accordingly, when the master device D0 receives a control message, each of the slave devices D1, D2, . . . , DN may check whether the control message is a message received by a corresponding slave device using the MAC address of the receiving side included in the MAC HEADER of the control message. The APP HEADER may include information processed in a high layer of the MAC HEADER.

Upon receiving a control message from the master device D0, the slave device D1 may extract input data (D-1 (received)) from a received data start position A of the control message. In this case, the input data (D-1 (received)) may be deleted from the control message. Then, the slave device D1 may generate output data (D-1 (transmitted)), pad the output data (D-1 (transmitted)) to a transmitted data storage position B of the control message and, then, transmit the output data to the slave device D2. In this case, a size of the output data (D-1 (transmitted)) may be variably set according to a data size and there is no limit in the size.

Upon receiving a control message from the slave device D1, the slave device D2 may extract input data (D-2 (received)) from the received data start position A of the control message 의 the received data start position A. In this case, the input data (D-2 (received)) may be deleted from the control message. Then, the slave device D2 may pad output data (D-2 (transmitted)) to the transmitted data storage position B of the control message and then transmit the output data to the next slave device D3.

When the aforementioned procedure is repeatedly performed, upon receiving a control message from a slave device DN-1, a last slave device DN may extract input data (D-N (received)) from the received data start position A of the control message. In this case, the input data (D-N (received)) may be deleted from the control message. Then, the slave device DN may pad output data (D-N (transmitted)) to the transmitted data storage position B of the control message and transmit the output data to the master device D0.

Accordingly, the master device D0 may receive a control message including output data (D1 (transmitted)), D2 (transmitted), . . . , DN (transmitted)). Then, the master device D0 may check whether each of a plurality of slave devices is normally operated based on output data of the control message.

Figure 6:
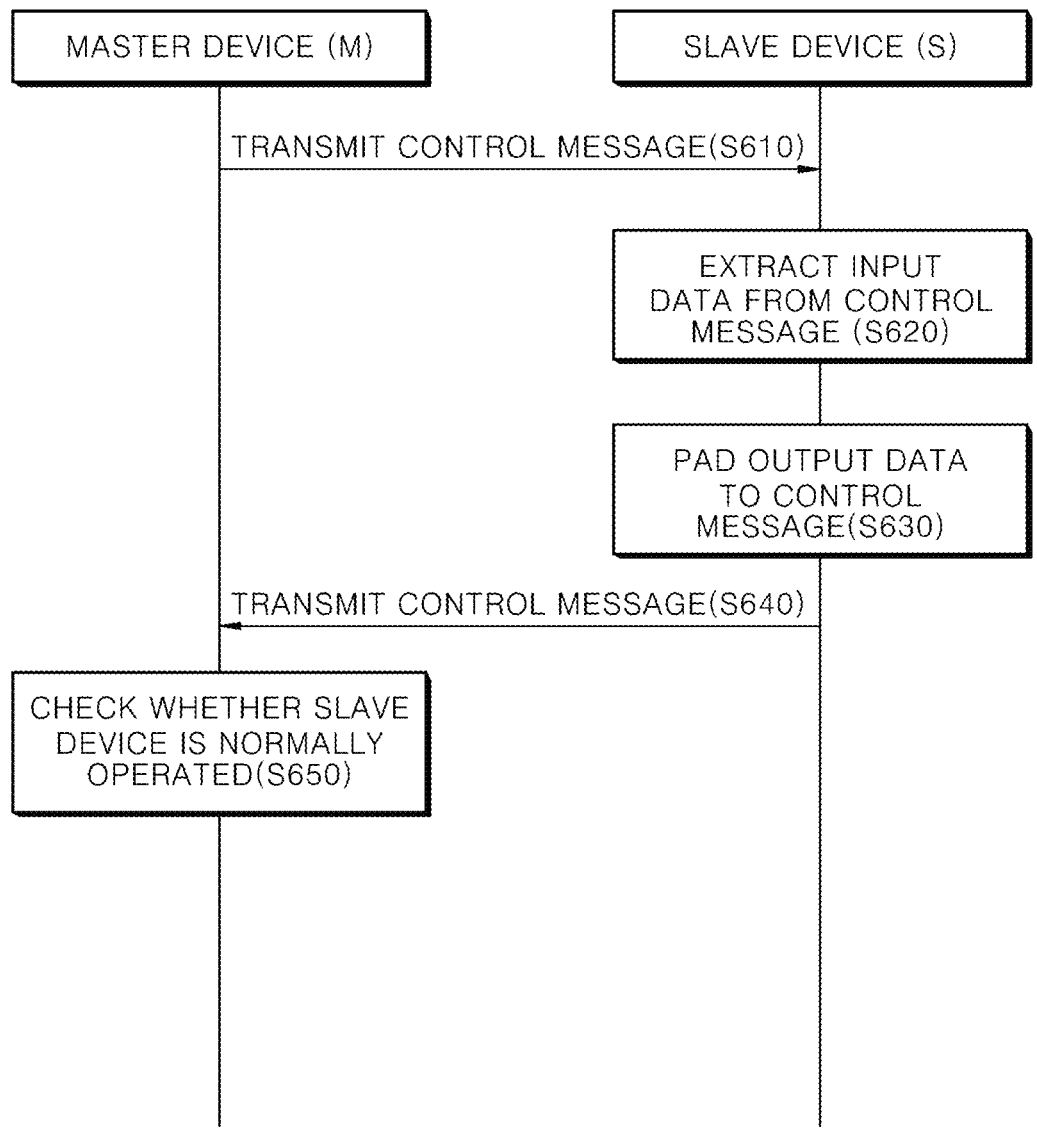
FIG. 6 is a flowchart for explanation of a slave device control method according to an exemplary embodiment of the present disclosure.

FIG. 6 is a flowchart for explanation of a slave device control method according to an exemplary embodiment of the present disclosure.

Referring to FIG. 6, a master device M may generate a control message including a plurality of input data and transmit the control message to specific slave device S among a plurality of slave devices (operation S610). In this case, the master device M may align a plurality of input data in an order or an opposite order in which a plurality of slave devices are connected to generate a control message.

Then, the master device M may transmit the control message to a first slave device or a last device among a plurality of slave devices.

In an exemplary embodiment of operation S610, when the master device M may align a plurality of input data in an order in which a plurality of slave devices are connected to generate the control message, the control message may be transmitted to a first slave device among a plurality of slave devices.

In another exemplary embodiment of operation S620, when the master device M may align a plurality of input data in an opposite order to an order in which the plurality of slave devices are connected to generate the control message, the control message may be transmit to a last slave device among a plurality of slave devices.

The slave device S may extract input data from the control message (operation S620). In an exemplary embodiment of operation S620, the slave device S may extract input data from the received data start position of the control message.

In this case, when the received data start position is a start position of the control message, the slave device S may extract input data from the start position of the control message. When the received data start position is a last position of the control message, input data may be extracted from a last position of the control message.

The slave device S may pad output data to the transmitted data storage position of the control message and transmit the output data to a next slave device (operation S630).

The master device M may check whether each of a plurality of slave devices is normally operated based on output data of the control message (operation S640).

According to the aforementioned present disclosure, all devices in a network are capable of transmitting and receiving data using one control message and, thus, traffic may be reduced and data delay time may be reduced. According to the present disclosure, a size of data transmitted to each slave device by a master device and a size of data transmitted to a master device by a slave data may be flexibly changed.

According to the present disclosure, all devices in a network are capable of transmitting and receiving data using one control message and, thus, traffic may be reduced and data delay time may be reduced.

In addition, according to the present disclosure, a size of data transmitted to each slave device by a master device and a size of data transmitted to a master device by a slave data may be flexibly changed.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A slave device control method comprising:
   generating, by a master device, a control message comprising a Media Access Control (MAC) header, a Application (APP) header, and a plurality of input data according to an order of a plurality of slave devices and transmitting the control message to a specific slave device corresponding to first input data among the plurality of slave devices; and
   wherein the generating comprises transmitting the control message to a first slave device among the plurality of slave devices when the plurality of input data is aligned in the order in which the plurality of slave devices is connected to generate the control message; and
   wherein the generating comprises transmitting the control message to a last slave device among the plurality of slave devices when the plurality of input data is aligned in an opposite order to the order in which the plurality of slave devices is connected to generate the control message;
   extracting, by each of the plurality of slave devices, corresponding input data among the plurality of input data from a received data start position of the control message, wherein the extracted corresponding input data is deleted from the control message; and
   padding, by each of the plurality of slave devices, output data to a transmitted data storage position of the control message and transmitting the output data to a next slave device,
   wherein if the received data start position is a start position of the control message, the transmitted data storage position of the control message is a last position of the control message, and if the received data start position is the last position of the control message, the transmitted data storage position of the control message is the start position of the control message; and
   wherein when the master device receives the control message associated with the plurality of slave devices, the master device checks whether the control message is a particular message received from one of the plurality of slave devices by using a MAC address included in the MAC header of the control message.

2. The method according to claim 1, wherein the generating comprises aligning the plurality of input data in an order or an opposite order in which the plurality of slave devices are connected to generate the control message.

3. The method according to claim 1, further comprising:
   determining the received data start position according to an order in which the plurality of input data is aligned and an order of slave devices that receive the control message; and
   determining the transmitted data storage position according to the received data start position.

4. The method according to claim 1, wherein a size of the input data and a size of the output data are variably set according to a size of data.

5. The method according to claim 1, further comprising:
   checking, by the master device, whether each of the plurality of slave devices is normally operated using output data of the control message.

* * * * *